United States Patent
Rausch et al.

(10) Patent No.: US 12,344,185 B2
(45) Date of Patent: Jul. 1, 2025

(54) BELT STRAP AND SAFETY BELT SYSTEM

(71) Applicant: ZF AUTOMOTIVE GERMANY GMBH, Alfdorf (DE)

(72) Inventors: Martina Rausch, Remshalden (DE); Viktorija Mecnika, Schwabisch Gmund (DE)

(73) Assignee: ZF AUTOMOTIVE GERMANY GMBH, Alfdorf (DE)

( * ) Notice: Subject to any disclaimer, the term of this patent is extended or adjusted under 35 U.S.C. 154(b) by 119 days.

(21) Appl. No.: 18/246,870

(22) PCT Filed: Sep. 27, 2021

(86) PCT No.: PCT/EP2021/076465
§ 371 (c)(1),
(2) Date: Mar. 28, 2023

(87) PCT Pub. No.: WO2022/069395
PCT Pub. Date: Apr. 7, 2022

(65) Prior Publication Data
US 2023/0365097 A1  Nov. 16, 2023

(30) Foreign Application Priority Data
Sep. 29, 2020  (DE) ..................... 10 2020 125 367.2

(51) Int. Cl.
*B60R 22/12*  (2006.01)
*B60N 2/56*  (2006.01)

(52) U.S. Cl.
CPC ............ *B60R 22/12* (2013.01); *B60N 2/5685* (2013.01)

(58) Field of Classification Search
None
See application file for complete search history.

(56) References Cited

U.S. PATENT DOCUMENTS

| | | | |
|---|---|---|---|
| 10,143,043 B1* | 11/2018 | Elson | ...................... B60R 22/48 |
| 2008/0139066 A1* | 6/2008 | Shimazaki | ............. B60R 22/12 |
| | | | 442/189 |
| 2008/0303253 A1* | 12/2008 | Ohhashi | .................. B60R 22/12 |
| | | | 280/808 |

(Continued)

FOREIGN PATENT DOCUMENTS

| | | |
|---|---|---|
| DE | 102016002932 A1 | 9/2016 |
| DE | 202018106937 U1 | 12/2018 |

(Continued)

OTHER PUBLICATIONS

PCT International Search Report for corresponding International Application Serial No. PCT/EP2021/076465, mailed Feb. 8, 2022, pp. 1-4.

*Primary Examiner* — Milton Nelson, Jr.
(74) *Attorney, Agent, or Firm* — Tarolli, Sundheim, Covell & Tummino LLP

(57) ABSTRACT

A webbing for a seat belt system (10) of an automotive vehicle has a woven webbing body (26) which includes warp threads extending in the longitudinal direction and weft threads extending transversely to the warp threads, and comprising at least one heating filament (28) which is woven into the webbing body (26) as a warp thread and/or a weft thread. The invention further describes a seat belt system (10).

10 Claims, 3 Drawing Sheets

(56) References Cited

U.S. PATENT DOCUMENTS

| | | | | |
|---|---|---|---|---|
| 2009/0134690 A1* | 5/2009 | Shimazaki | ........... | D03D 1/0005 |
| | | | | 297/475 |
| 2019/0176566 A1* | 6/2019 | Maranville | .......... | B60H 1/2215 |
| 2020/0039399 A1* | 2/2020 | Oomen | .................... | H05B 3/38 |
| 2021/0170986 A1* | 6/2021 | Niebling | ................. | B60R 22/12 |
| 2021/0309179 A1* | 10/2021 | Zhang | ..................... | B60H 1/00 |
| 2021/0339700 A1* | 11/2021 | Rausch | .................. | B60R 22/12 |
| 2024/0208458 A1* | 6/2024 | Mecnika | ................ | B60R 22/12 |

FOREIGN PATENT DOCUMENTS

| | | |
|---|---|---|
| DE | 102018007601 A1 | 3/2020 |
| DE | 102018124241 A1 | 4/2020 |
| FR | 2765834 A1 | 1/1999 |
| JP | 2017185956 A | 10/2017 |
| JP | 2017213866 A | 12/2017 |
| JP | 2017217879 A | 12/2017 |

\* cited by examiner

BELT STRAP AND SAFETY BELT SYSTEM

RELATED APPLICATIONS

This application is a U.S. National Stage Application filed under 35 USC 371 claiming priority to Serial No. PCT/EP2021/076465, filed on 27 Sep. 2021; which claims priority from German Patent Application DE 10 2020 125 367.2, filed 29 Sep. 2020, the entireties of which are hereby incorporated herein by reference.

TECHNICAL FIELD

The invention relates to a webbing for a seat belt system of an automotive vehicle and to a seat belt system.

BACKGROUND

The seat belt system serves to restrain a vehicle occupant when the vehicle is strongly decelerated so that he/she themselves are decelerated as evenly as possible and are prevented from contacting objects inside the vehicle (such as a steering wheel or an instrument panel).

Apart from the safety aspect, there have already been endeavors to integrate amenity functions into the webbing. These amenity functions include, for example, a heating function.

For this purpose, one or more heating elements introduced to a braided hose are stitched onto the webbing or integrated in the webbing in particular zones of the webbing. The braided hose is arranged, for example, in the pelvis region or in the thorax and shoulder region of a vehicle occupant.

The multi-part heating component made of the braided hose and the heating elements is complex to manufacture, however, and has a relatively large thickness compared to the webbing. Therefore, the thickness of the structure resulting from the webbing and the braided hose is comparatively large so that problems may arise in these regions when the webbing is wound up and when a locking tongue is moved along the webbing.

SUMMARY

It is the object of the invention to provide a webbing with amenity function as well as a seat belt system comprising such webbing that is simple in manufacture and eliminates the drawbacks of the state of the art.

This object is achieved, according to the invention, by a webbing for a seat belt system of a vehicle comprising a woven webbing body that includes warp threads extending in the longitudinal direction and weft threads extending transversely to the warp threads, and comprising at least one heating filament that is woven into the webbing body as a warp thread and/or a weft thread. In this way, the heating filament can be integrated in the webbing body without disadvantageously affecting safety-relevant characteristics, such as the breaking load of the webbing. Consequently, the heating filament is woven into the webbing body like a "normal" warp thread and/or weft thread having no heating function. Thus, during manufacture of the webbing body, between the normal warp and/or weft threads no clearance into which the heating component will be inserted later has to be spared, as this is done in the state of the art. Hence, the webbing can be manufactured in a specifically simple manner. The heating filament woven into the webbing can help heat the latter over its total length or only in portions depending on the design. In this way, a vehicle occupant's comfort inside the vehicle can be increased.

Preferably, the thickness of the heating filament corresponds to a thickness of the normal warp and weft threads, such as 50 to 1670 dtex. Accordingly, the thickness of the webbing body including the woven-in heating filament substantially corresponds to the thickness of the normal webbing body without a woven-in heating filament so that the thickness of the webbing body is not increased by integrating the heating filament into the same. As a consequence, no problems will arise when winding up the webbing or when moving the locking tongue along the webbing, as this is the case in the state of the art.

According to one embodiment, the heating filament is woven into the webbing body over the whole length of the webbing. This enables the heating filament to be used just as the normal warp and weft threads as endless threads when manufacturing the webbing, wherein the heating filament and the warp and weft threads are interwoven as endless threads. In this way, the manufacture of the webbing can be considerably facilitated.

In one embodiment, the heating filament is disconnected in at least two points of the webbing body. A disconnection point can be, on the one hand, a severing of the heating filament and, on the other hand, a disconnection of the integration of the heating filament in the webbing body, i.e., guiding the heating filament out of the webbing body. At the disconnection points, the heating filament is easily accessible, i.e., other components such as electrical contacts can be easily connected to the heating filament.

The heating filament may be exposed and electrically contacted at the disconnection points. In this way, the heating filament is especially easily accessible.

Between the individual disconnection points potentially heatable sections are formed which are defined by the heating filament disposed therein. By coupling the heating filament to a power source, the respective section can be heated by the heating filament so that the associated section forms a heating section. Sections between disconnection points whose associated heating filament is not coupled to a power source constitute inactive sections as regards the heating function.

Specifically, the disconnection points are electrically interconnected. To this end, the heating filament may be contacted by a power source at its opposite ends, i.e., at the different disconnection points of the heating section, having different polarity.

When the heating filament comprises plural heating elements, the heating elements may be coupled to the power source at one end of the heating filament, i.e., at one disconnection point of the heating section, and may be coupled to each other at the opposite end of the heating filament, i.e., at the other disconnection point of the heating section, so as to be part of an electric circuit.

For forming an additional heating section, the individual heating sections may be electrically coupled to each other or a separate power source may electrically contact the individual heating sections.

According to one aspect, a cover, specifically a coating, covering the exposed heating filament is provided at a disconnection point. In this way, the vehicle occupant can be prevented from getting in contact with possibly sharp ends of the heating filament and with the heating filament as an exposed heat contact and electrical contact.

For example, the coating is made of rubber. In this way, the coating can be easily applied to, such as injected onto, the webbing.

One embodiment provides the heating filament to include a carbon fiber or a silver thread. Those materials have an excellent heat conductivity and can be directly woven into the webbing.

According to the invention, the heating filament comprises at least two strands which are twisted to each other.

The strands can be woven into the webbing body as endless wires when the webbing is manufactured, wherein the endless wires have been twisted to each other in a preceding method step.

For facilitating the weaving of the strands into the webbing body, the twisted strands can be braided. The braided strands then constitute a single yarn that can be woven just as the normal warp and weft threads to manufacture the webbing. Moreover, the braided strands can be dyed just as the normal warp and weft threads.

Optionally, an edge guard may be provided at the webbing body. In this way, the webbing can be designed to have a more convenient haptic feeling for the vehicle occupant, and the heating filament can be protected against abrasion, for example by moving the locking tongue along the webbing or by winding the webbing.

For example, the edge is a hollow edge or a semi-hollow edge or the edge is manufactured by a double-needle technology.

Furthermore, according to the invention, the object is achieved by a seat belt system for a vehicle comprising a power source, a belt retractor, an end fitting and an above-described webbing according to the invention. The webbing is fixed to a first end on the end fitting and is retractably secured to a second end opposite to the first end on the belt retractor. In the area of the belt retractor and/or in the area of the end fitting, the heating filament is coupled to the power source. In this way, a seat belt system comprising a webbing that is at least partially heatable can be provided.

Electrical contact can be applied at opposite poles to the heating filament in the area of the end fitting or in the area of the belt retractor, for example. Then, electrical contact can be applied to the heating filament over the whole length of the webbing or electrical contact can be partially applied due to disconnection points.

For example, the power source is a seat heating. A seat heating is installed as a standard feature in most automotive vehicles so that no additional separate power source has to be provided for applying electrical power to the heating filament.

The above-described advantages and features of the webbing according to the invention are equally applicable to the seat belt system, and vice versa.

BRIEF DESCRIPTION OF THE DRAWINGS

Further advantages and features of the invention will result from the following description and from the attached drawings which are referred to, wherein.

DESCRIPTION

Figure 1:
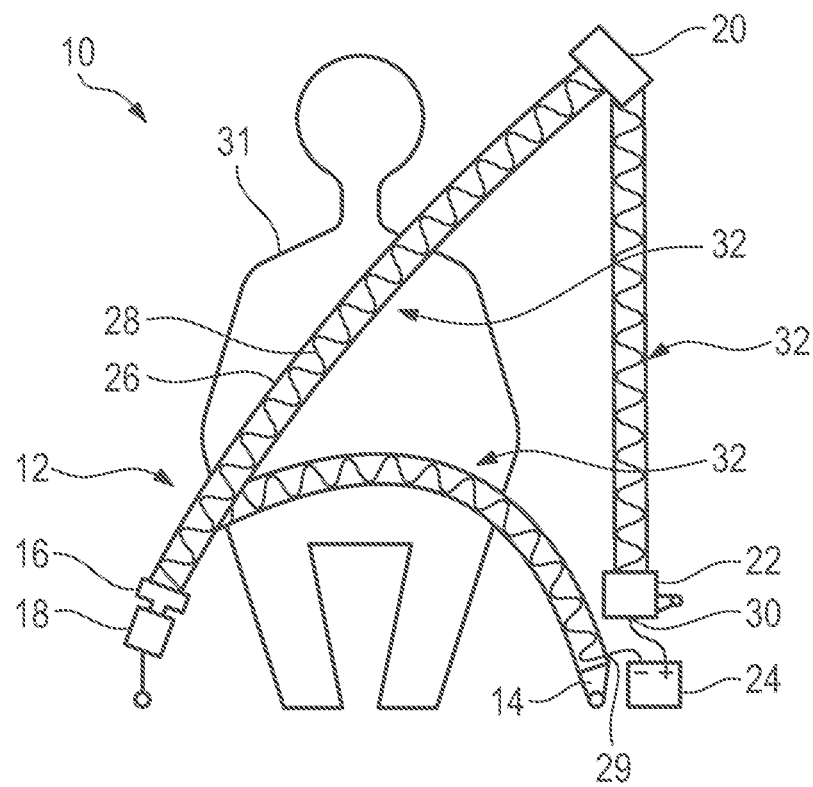
FIG. 1 schematically shows a first embodiment of a seat belt system according to the invention, FIG. 2 schematically shows a section of a webbing according to the invention of the seat belt system as set forth in FIG. 1.

FIG. 1 illustrates a first embodiment of a seat belt system 10 for an automotive vehicle.

The seat belt system 10 includes a webbing 12, an end fitting 14, a locking tongue 16, a belt buckle 18, a deflector 20, a belt retractor 22 and a power source 24.

The power source 24 in this case is an electric power source such as a battery.

The webbing comprises a webbing body 26 and a heating filament 28 integrated in the webbing body 26.

The webbing 12 is secured to a first end via the end fitting 14 and to a second end opposite to the first end via the belt retractor 22 on the vehicle. The webbing 12 can be coupled to the belt buckle 18 via the locking tongue 16 movably mounted on the webbing 12.

In the area of the fasteners on the vehicle, the heating filament 28 is coupled to the power source 24.

The heat filament 18 extends starting from a first end of the webbing 12 in the area of the end fitting 14 over the whole length of the webbing 12 to a second end of the webbing 12 opposite to the first end in the area of the belt retractor 22.

At the two ends, the heating filament 28 is guided out of the webbing body 26 so that the integration of the heating filament 28 in the webbing body 26 is disconnected at said points. Said points are referred to as disconnection points 29, 30.

The heating filament 28 can be sewn over the weft at the disconnection points 29, 30 so that the heating filament 28 is continued outside the webbing body 26 and can be connected directly to the power source 24.

Alternatively, the heating filament 28 can be connected to the contact poles of the power source 24 in the area of the disconnection points 29, 30 via separate contact elements.

The heating filament 28 applied with power, in this case electric current, via the power source 24 forms a heating section 32 at the webbing 12 in the area of its extension, i.e., between the disconnection points 29, 30.

In the first embodiment according to FIG. 1, said heating section 32 extends over the whole length of the webbing 12.

The heating filament 28 heats the webbing 12 and, consequently, a vehicle occupant 31. This results in increased comfort.

Due to the heating filament integrated in the webbing body 26, the webbing 12 thus also has an amenity function apart from the safety function.

Figure 2:
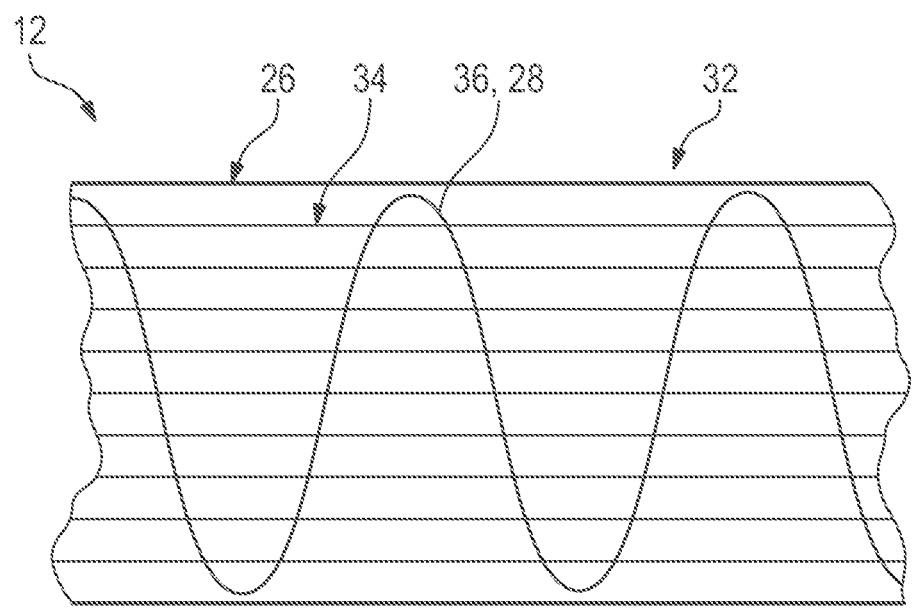

In FIG. 2, a cutout of the heating section 32 of the webbing 12 is shown.

The webbing body 26 is woven of plural longitudinally extending warp threads 34 and weft threads 36 extending transversely to the warp threads 34, in FIG. 2 merely some warp threads 34 and one weft thread 36 being illustrated.

FIG. 2 is an extremely simplified view. In reality, the weft threads 36 extend substantially orthogonally to the warp threads 34.

The weft thread 36 illustrated in FIG. 2 at the same time represents the heating filament 28. Accordingly, the heating filament 28 is woven into the webbing body 26—just as the normal weft threads 36.

Alternatively, or additionally, one or more of the warp threads 34 may also constitute a heating filament 28.

As a matter of course, the webbing 12 can also include more than one heating filament 28.

For manufacturing the webbing 12, the warp threads 34 and the weft threads 36 are provided as endless threads and are interwoven in a known manner. One or more of the endless weft threads and/or endless warp threads is/are designed as heating filament 28 which consequently is also endlessly woven in.

The endless webbing produced by interweaving the endless threads is cut to specific lengths required for use in a vehicle so as to design the webbing 12.

The thickness of the heating filament 28 is smaller or corresponds substantially to the thickness of the normal warp threads 34 and/or weft threads 36.

For example, the thickness ranges from 50 to 1670 dtex.

Optionally, the heating element 38 may be braided, such as by polyester yarns.

Figure 3:
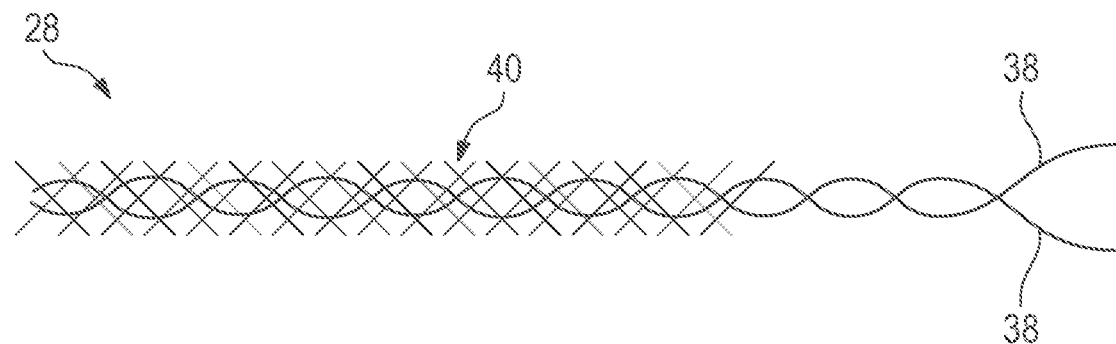
FIG. 3 shows a schematic structure of a heating filament applicable to the invention, FIG. 4 schematically shows a second embodiment of the seat belt system according to the invention, FIG. 5 schematically shows a section of a further embodiment of a webbing according to the invention which can be used in the seat belt system according to FIG. 4, and FIG. 6 schematically shows a section of a further embodiment of a webbing according to the invention that can be used in the seat belt system according to FIG. 4.

A variant of the heating filament 28 according to the invention is shown in FIG. 3.

In this case, the heating filament 28 comprises plural, in this case two, heating elements 38 being configured as strands and being twisted to each other.

Optionally, the two twisted heating elements 38 may be braided, such as by polyester yarns 40.

The two heating elements 38 are connected to a contact pole of the power source 24 at their joint first end, i.e., in the region of the first disconnection point 29, and extend over the whole length of the webbing 12 to the other contact pole of the power source 24 that is located at the second joint end of the heating elements 38, i.e., in the region of the second disconnection point 30.

Figure 4:
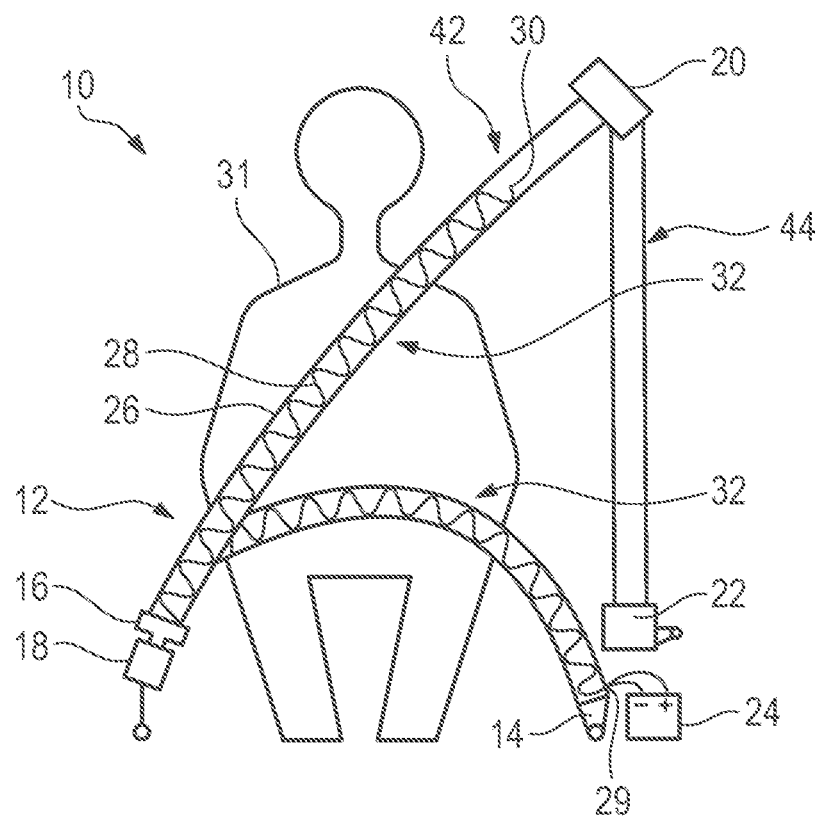

FIG. 4 illustrates a second embodiment of the seat belt system 10 which substantially corresponds to the first embodiment according to FIG. 1. In the following, therefore only the differences shall be discussed, and equal and equally operating parts are provided with the same reference numerals.

The seat belt system 10 of the second embodiment differs from that of the first embodiment in that the heating filament 28 does not extend over the whole length of the webbing 12 but merely over a section of the webbing 12 which is located in the region of the vehicle occupant 31.

Accordingly, the heating filament 28 is coupled, at its first end close to the end fitting 14, i.e., in the region of the first disconnection point 29, to both contact poles of the power source 24. At its second end opposed to the first end, i.e., in the region of the second disconnection point 30, the heating filament 28 has a free end 42.

For the second embodiment shown here a heating filament 28 of the configuration according to FIG. 3 is obvious, as in this way each of the individual heating elements 38 can be electrically coupled at a joint end to a contact pole of the power source 24. In addition, the twisting ensures an electric contact being applied to the heating elements 38 even at the free end 42.

Figure 5:
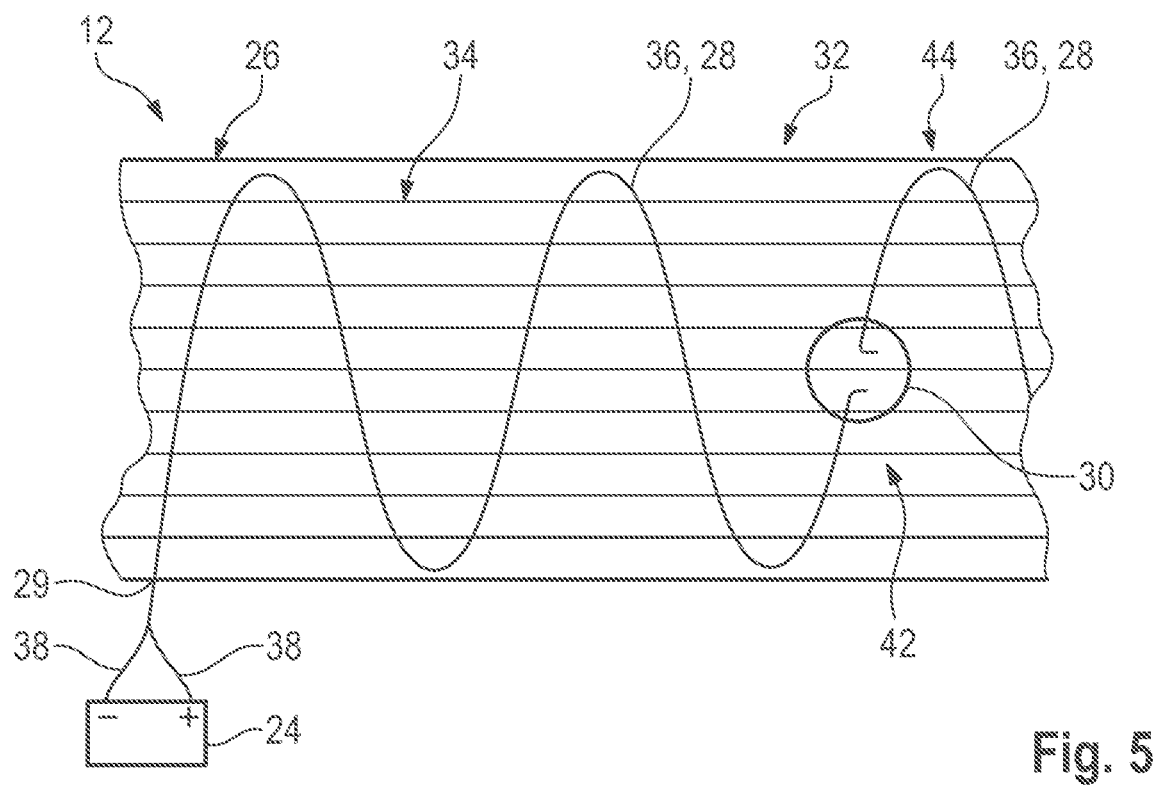
Figure 6:
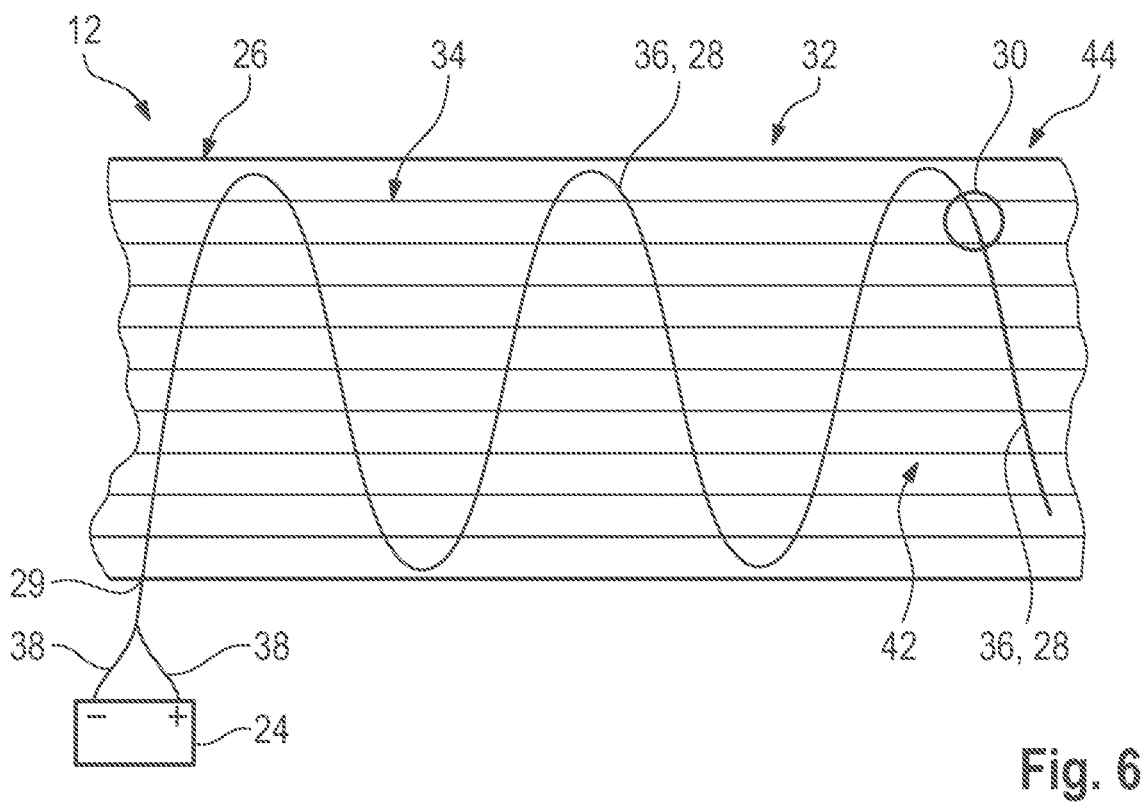

In FIGS. 5 and 6, two different configurations of the free end 42 of the heating filament 28 are shown.

In the first configuration according to FIG. 5, the disconnection point 30 is formed in the region of the free end 42 in such a manner that the heating filament 28 is severed in this region.

Consequently, the disconnection point 30 is not defined by disconnecting the integration of the heating filament 28 in the webbing body 26 but by severing the heating filament 28.

Due to the severing of the heating filament 28 in the region of the disconnection point 30, the part of the heating filament 28 on the heating section side and the part of the heating filament 28 on the normal section side are electrically disconnected from each other. Accordingly, the part of the heating filament 28 on the normal section side is no longer supplied with power by the power source 24 so that this part of the heating filament 28 cannot be heated anymore and, thus, is inactive.

The part of the heating filament 28 on the normal section side thus defines a normal section 44 of the webbing 12. The heating section 32 is disconnected from the normal section 44 by the disconnection point 30.

In the normal section 44, the heating filament 28 is thus continued as an inactive heating filament 28.

When manufacturing the webbing 12 according to the configuration of FIG. 5, the heating filament 28 is interwoven—corresponding to the first embodiment of the seat belt system 10 according to FIG. 1—as an endless weft thread with the endless warp threads so that the heating filament 28 extends over the whole length of the webbing 12. The weft thread 36 is woven in the area of the disconnection point 30 by a weft float such that the weft thread 36 rests at the top or at the bottom on the associated warp threads 34. The weft thread 36 is exposed in the region of the disconnection point 30 and, accordingly, is accessible from outside for severing.

The configuration according to FIG. 6 differs from the one according to FIG. 5 by the fact that the heating filament 28 is guided out of the webbing body 26 in the region of the disconnection point 30 of the free end 42 so that the heating filament 28 runs out outside the webbing body 26.

Consequently, the heating filament 28 does not continue as an inactive heating filament 28 in the webbing body 26 but ends in the region of the disconnection point 30.

The heating filament 28 is exposed in the region guided out after the disconnection point 30.

For protecting the exposed sections of the heating filament 28 in the region of the disconnection point 30 (FIG. 5) or after the disconnection point 30 (FIG. 6), a cover may be provided in the form of a flexible coating made of rubber, for example, which covers the exposed sections of the heating filament 28.

In addition, in the region of the reversal points of the heating filament 28 an edge guard may optionally be provided, thereby ensuring more convenient haptic feeling for the vehicle occupant 31 and protecting the heating filament 28 against abrasion, e.g., when retracting the webbing 12 or when moving the locking tongue 16 along the webbing 12.

The edge guard may be a bluff edge or a semi-bluff edge, for example, or may be produced by a double-needle technology.

The heating filament 28 designed as weft thread 36 in FIGS. 1 to 6 is merely an example embodiment. As a matter of course, it is possible to interweave the heating filament 28 alternatively or additionally as one warp thread 34 or plural warp threads 34 for manufacturing the webbing 12 with the normal warp threads 34 and weft threads 36.

The invention claimed is:

1. A webbing for a seat belt system (10) of an automotive vehicle, comprising
a woven webbing body (26) which includes warp threads (34) extending in the longitudinal direction and weft threads (36) extending transversely to the warp threads (34), and
at least one heating filament (28) which is woven into the webbing body (26) as a warp thread (34) and/or a weft thread (36),
wherein the heating filament (28) comprises at least two strands which are twisted to each other, the two strands being woven into the webbing body together as the warp thread and/or the weft thread.

2. The webbing according to claim 1, wherein the heating filament (28) is woven into the webbing body (26) over the whole length of the webbing (12).

3. The webbing according to claim 1, wherein the heating filament (28) is disconnected in at least two points (29, 30) of the webbing body (26).

4. The webbing according to claim 3, wherein the heating filament (28) is exposed at the disconnection points (29, 30) and an electrical contact is applied thereto.

5. The webbing according to claim 3, wherein the disconnection points (29, 30) are electrically connected to each other.

6. The webbing according to claim 3, wherein at one disconnection point (29, 30) a cover, specifically a coating, is provided to cover the exposed heating filament (28).

7. The webbing according to claim 1, wherein the heating filament (28) includes a carbon fiber or a silver thread.

8. The webbing according to claim 1, wherein the two strands are braided.

9. The webbing according to claim 1, wherein an edge guard is provided.

10. A seat belt system for an automotive vehicle, comprising
- a power source (24),
- a belt retractor (22),
- an end fitting (14), and
- a webbing (12) according to claim 1, the webbing being fixed to a first end on the end fitting (14) and being retractably secured to a second end opposed to the first end on the belt retractor (22),
- wherein the heating filament (28) is coupled to the power source (24) in a region of the belt retractor (22) and/or in a region of the end fitting (14).

* * * * *